March 15, 1927.

F. C. MOCK ET AL 1,620,827

CARBURETOR

Filed July 10, 1918 10 Sheets-Sheet 1

Inventors
Frank C. Mock
Charles J. Gustafson
Milton E. Chandler
By Brown Hanson Boettcher
Attorneys

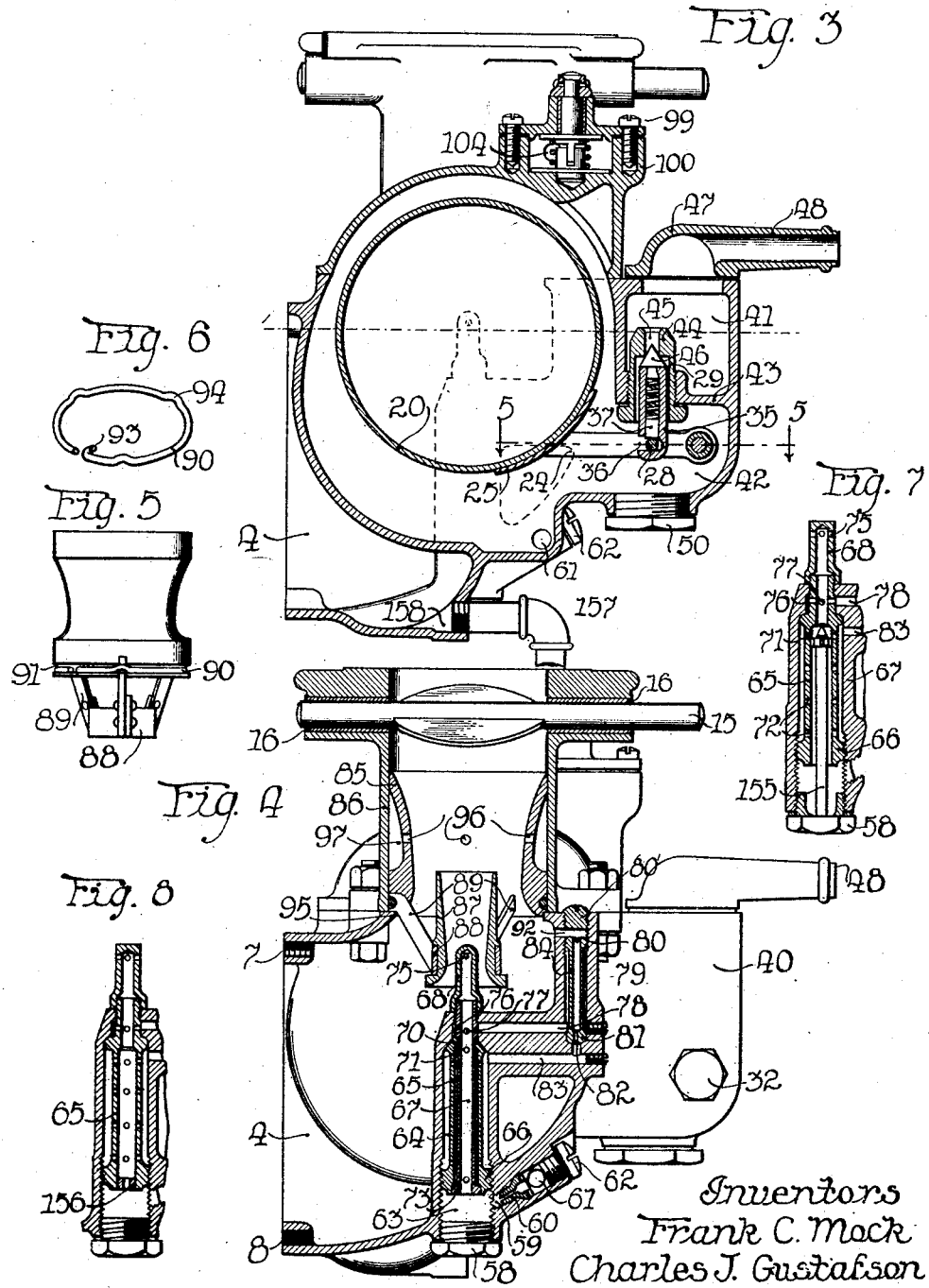

March 15, 1927.  1,620,827
F. C. MOCK ET AL
CARBURETOR
Filed July 10, 1918    10 Sheets-Sheet 3
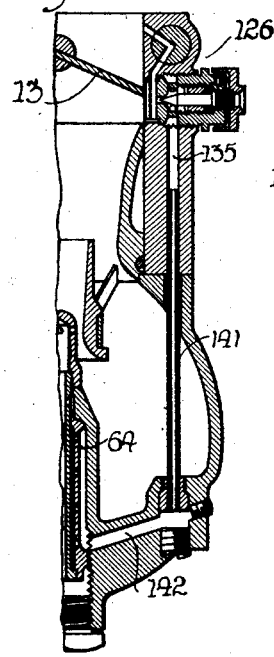
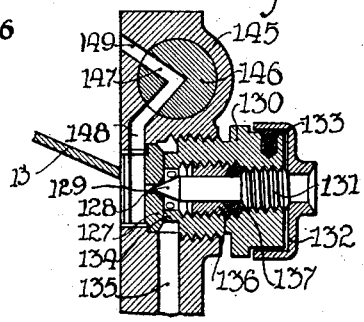
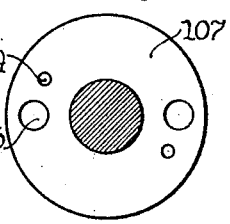
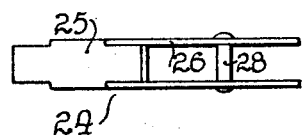
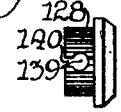
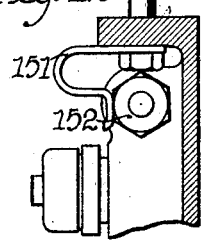
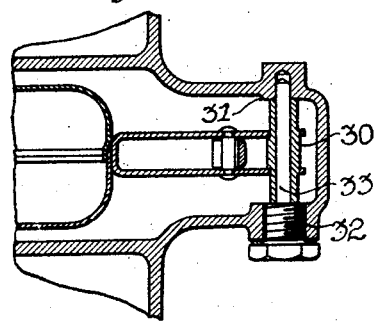
Inventors
Frank C. Mock
Charles. J. Gustafson
Milton E. Chandler
By Brown Hansen & Gottass
Attorneys

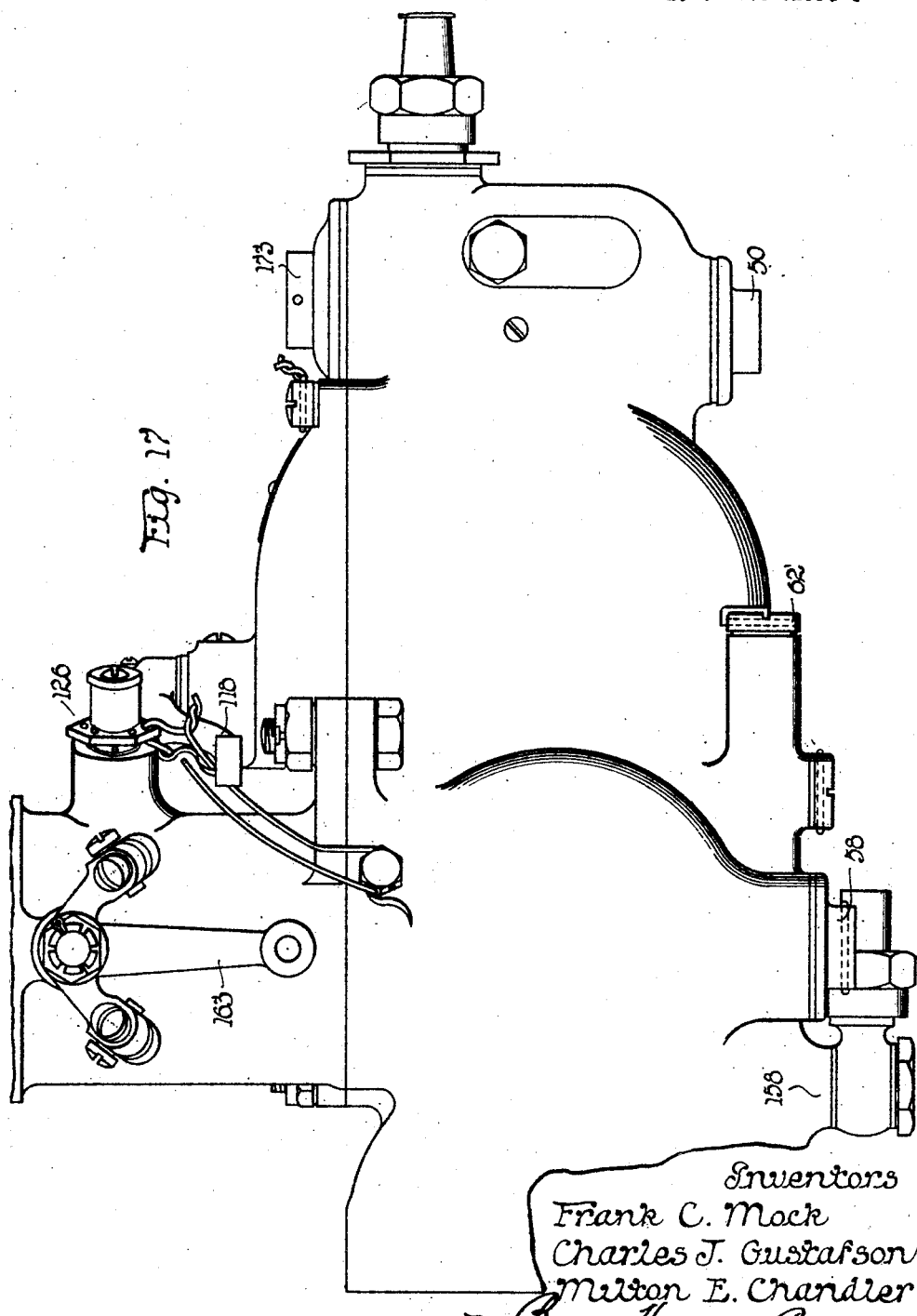

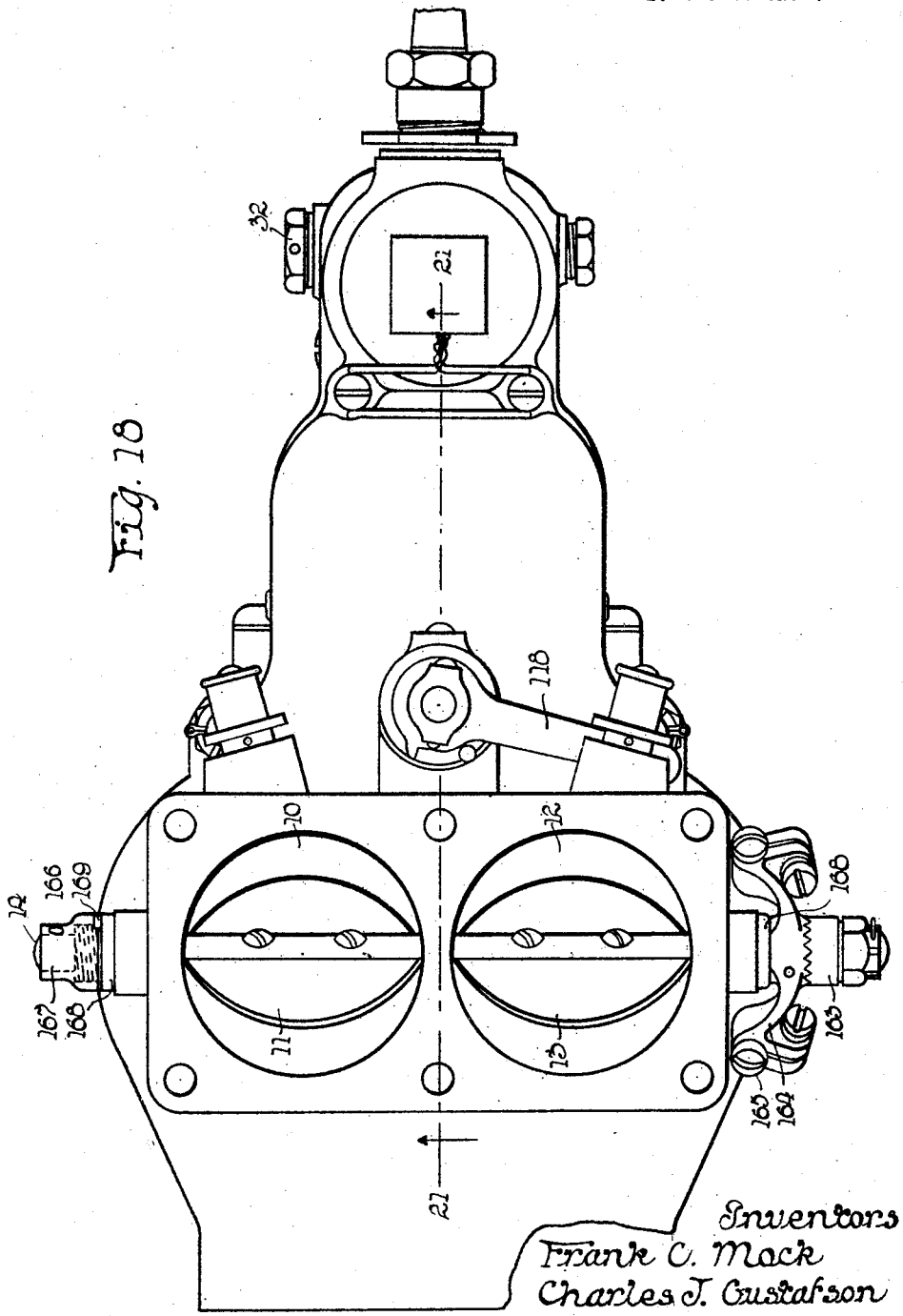

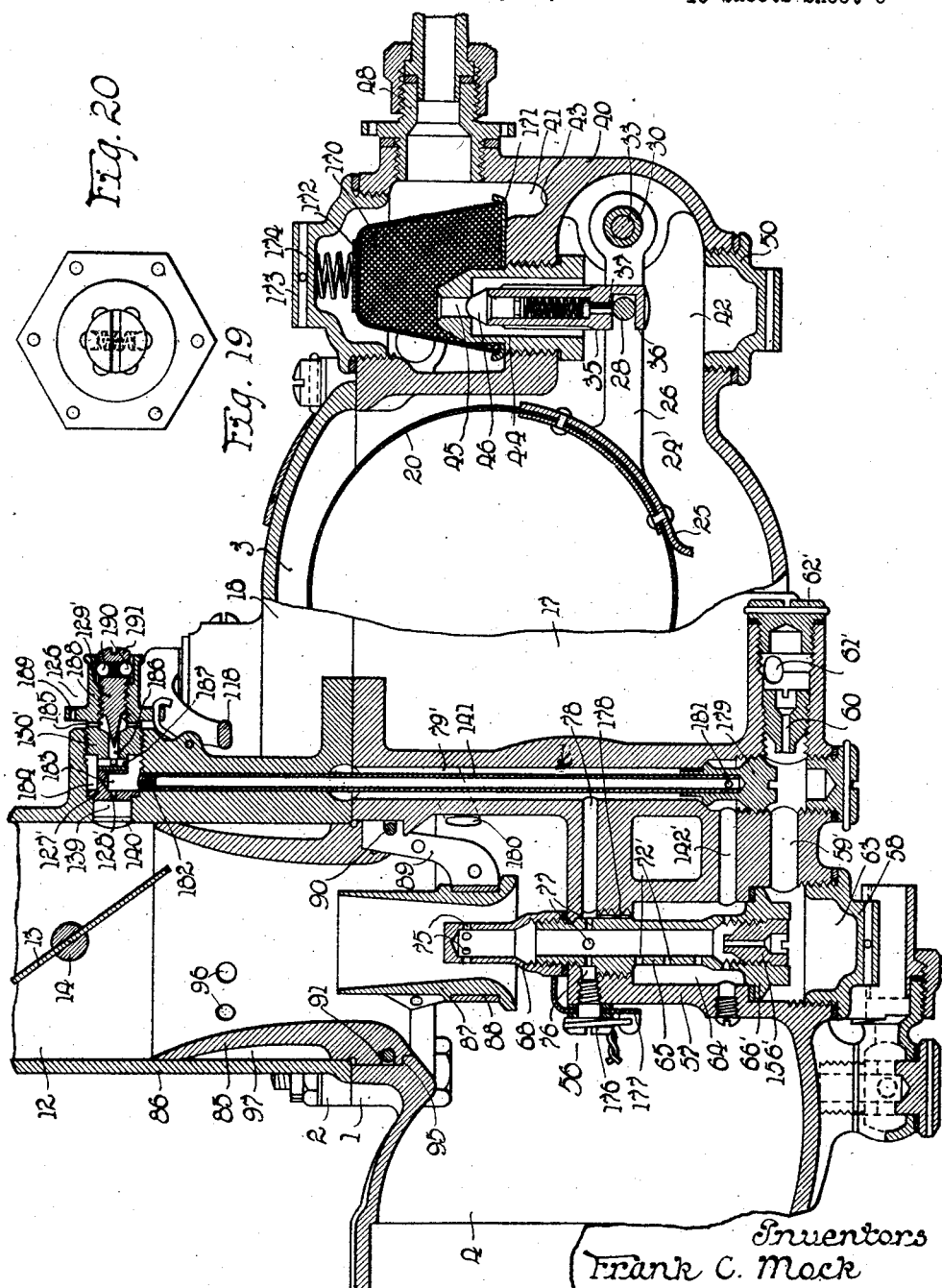

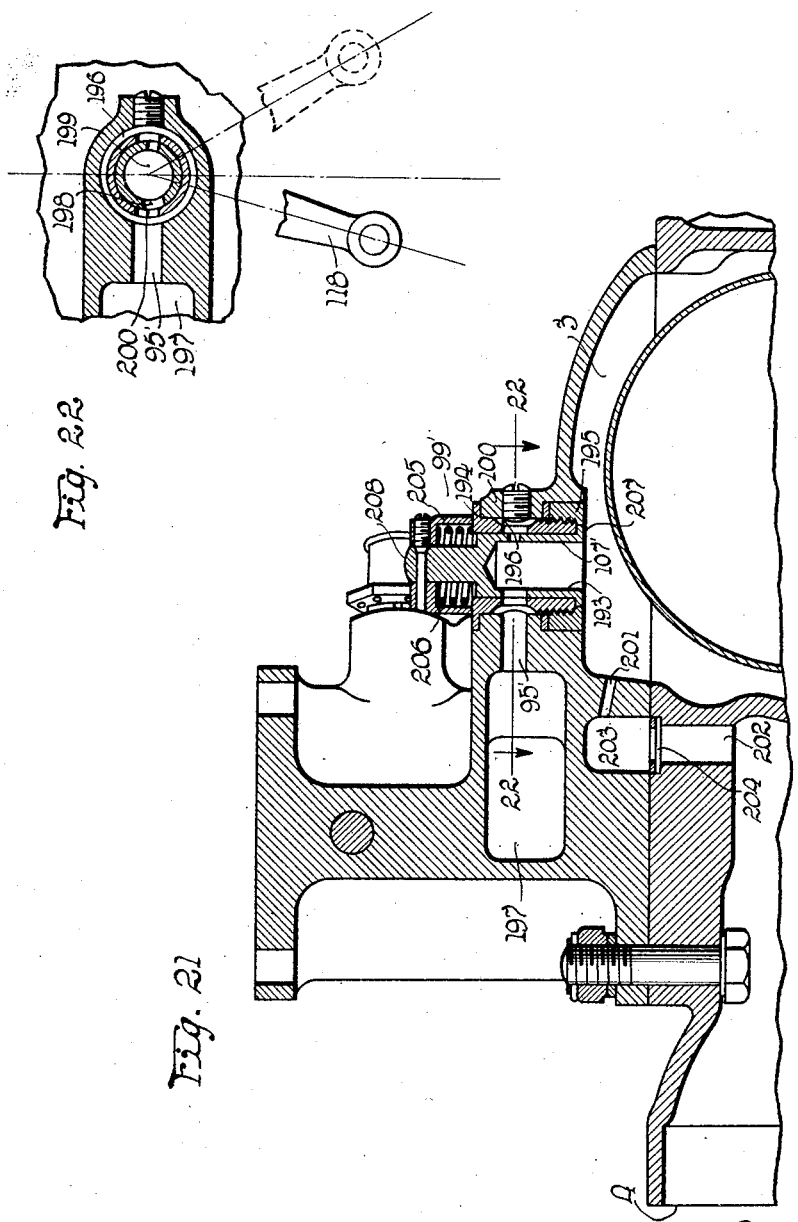

March 15, 1927.  F. C. MOCK ET AL  1,620,827

CARBURETOR

Filed July 10, 1918  10 Sheets-Sheet 8

Inventors
Frank C. Mock
Charles J. Gustafson
Milton E. Chandler
By Brown Hanson Boettcher
Attorneys March 15, 1927.
F. C. MOCK ET AL
CARBURETOR
Filed July 10, 1918    10 Sheets-Sheet 9
1,620,827
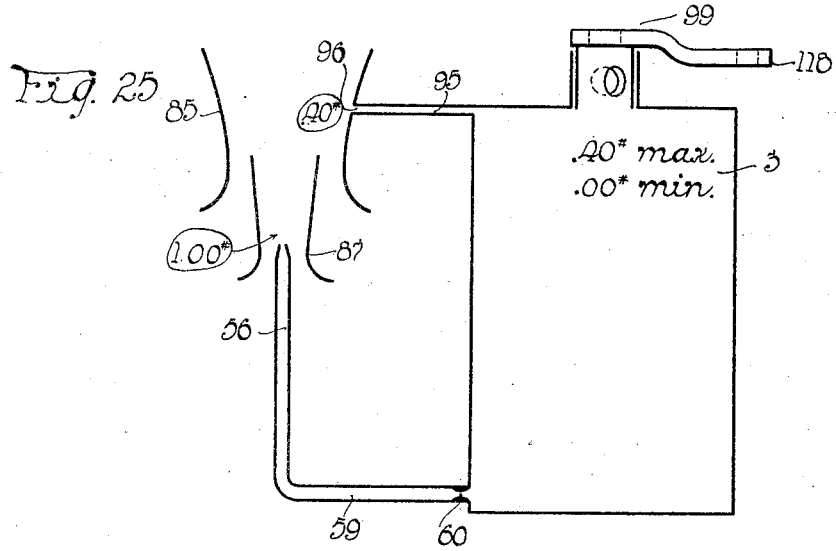
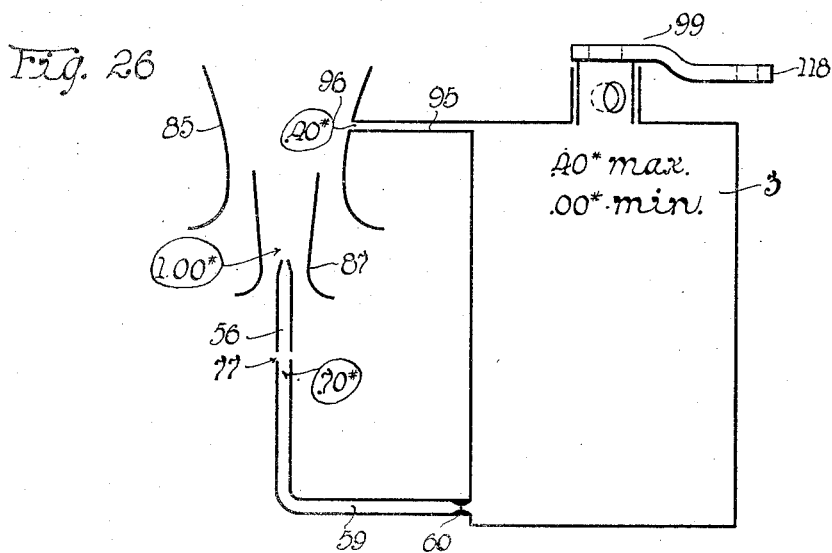
Inventors
Frank C. Mock
Charles J. Gustafson
Milton E. Chandler
By Brown Hanson & Bottom
Attorneys

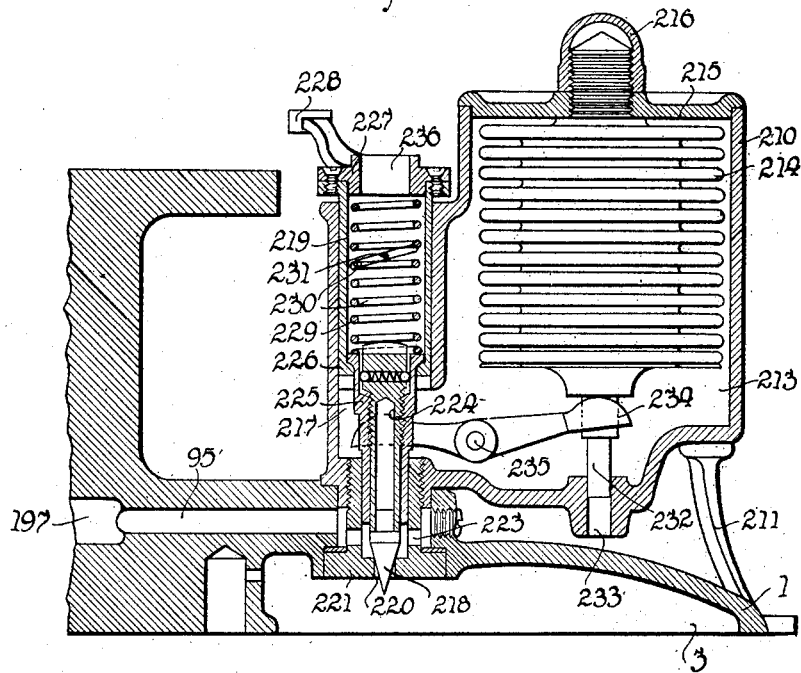

Patented Mar. 15, 1927.

1,620,827

UNITED STATES PATENT OFFICE.

FRANK C. MOCK, CHARLES J. GUSTAFSON, AND MILTON E. CHANDLER, OF CHICAGO, ILLINOIS, ASSIGNORS TO STROMBERG MOTOR DEVICES COMPANY, OF CHICAGO, ILLINOIS, A CORPORATION OF ILLINOIS.

CARBURETOR.

Application filed July 10, 1918. Serial No. 244,231.

Our invention relates to carburetors.

The primary object of the invention is to provide an improved carburetor, such as is demanded for aeroplane motors.

The particular embodiment which we shall describe in detail later provides two outlets as are required for engines having two sets of cylinders and two manifolds.

The severe and unusual conditions of usage demanded by aeroplane work have required changes in structure and function of the carburetor and have required operation of the carburetor under conditions not to be found in any other class of service.

The most unusual condition is the variation of air pressure. Carburetors in general have to do with mixing of the liquid fuel and air. As the carburetor enters a region where the air is under less pressure and is less dense, the proportions of air and liquid fuel tend to vary to the detriment of the working of the engine. For any given engine speed the weight of air flowing past a given point decreases proportionately with the density, but the liquid flow influenced by the air decreases as square root of the density of air. Therefore, in localities of rarefied air the fuel to air proportion is increased forming too rich a mixture.

We have provided a manual control of the pressure on surface of the liquid fuel in the float chamber for controlling the effective head of liquid and thus it is possible to make adjustment for the change in atmospheric condition so as to maintain a proper mixture. It is apparent that mechanical adjustment of the size of the liquid fuel orifices could be made, but we have found such adjustment to be impractical.

Furthermore where more than one carburetor is provided it is practically impossible to secure like metering of both instruments. The means which we have provided permits of the adjustment of any number of carburetors from a common point, to the setting desired and to any degree of accuracy required. We have further provided automatic means for exercising the control in accordance with pressure and with temperature of the atmosphere.

We have further provided a novel relation of air bled jet and suction control of the pressure on the fuel in the float chamber which permits of a wider variation of the effective head of fuel in the float chamber than has heretofore been possible. We employ a double venturi for breaking up and properly mixing the liquid fuel with the air. The fuel nozzle enters the inner venturi and is therein subjected to a maximum suction. The top of the float chamber communicates with the outer venturi and is subjected to a definite proportion of the maximum suction. The jet is air bled and this reduces the effective suction upon the gasoline from the float chamber. Consequently the pressure variation possible upon the gasoline in the float chamber becomes a much greater factor in controlling flow.

Another unusual condition met in aeroplane practice is the tilting of the carburetor sidewise when the aeroplane is caused to sideslip on an angle. Another condition is the fore and aft tilting of the carburetor caused by climbing or diving of the aeroplane. Another condition to be met is the requirement for large free passages of air, necessitated by maximum demand for power, and particularly desirable under reduced air pressures at greater altitudes. The nature of the mounting of the carburetor and the lack of any stable foundation or heavy frame entails vibration to a greater degree than would be tolerated in automobile or other practice.

These conditions, as well as others, are overcome by our present invention. Particularly for meeting the conditions of tilting both sidewise and fore and aft, we provide a novel arrangement of the air inlet, the fuel jets, the float chamber, the float and float valve. We provide novel means and arrangement of parts for governing the feed of the fuel jets by controlling the degree of sub-atmosphere prevailing in the float chamber, independently of the distribution of the fuel between jets. The float chamber, float and valve of our invention are all particularly adapted for aeroplane and similar service, although we do not intend the invention to be limited to such use.

We have observed that in carburetors of the prior art, in which an idling jet and a main or working jet are employed, there is a tendency to form an unsatisfactory mixture when the throttle is partly opened. This occurs particularly where the carburetor is made with a fairly large air passage through the carbureting chamber. In such devices, it appears that a partial opening of the throttle cuts down the output of the idling jet without gaining a sufficient increase in the functioning of the main jet to provide a proper mixture. We have provided a novel arrangement of the idling jet in connection with the throttle and the main jet, to insure proper coordination of the jets to form the proper mixture for all positions of the throttle valve.

Numerous other improvements will be apparent from the following specification and claim.

In the accompanying drawings, which form a part of the present specification, we have illustrated one embodiment in which our invention may appear.

Figure 3 is a transverse vertical section taken on the line 3—3 of Figure 1;

Figure 4 is a transverse section through one of the units on the line 4—4 of Figure 1;

Figure 5 is an elevational view of the main venturi with the suspension for the secondary venturi;

Figure 6 is a perspective view of the spring ring for holding the supporting spider for the secondary venturi upon the main venturi;

Figure 7 is a section of a modified form of main jet;

Figure 8 is a similar sectional view of another modification;

Figure 9 is a vertical section through the idling jet taken on the line 9—9 of Figure 1;

Figure 10 is an enlarged detailed view of the same;

Figure 11 is an elevation of the idling jet nozzle;

Figure 12 is a fragmentary detail of construction of the holding means for the idling control valve;

Figure 13 is a section of the float chamber control valve on the line 13—13 of Figure 1;

Figure 14 is a plan view of the valve disc shown in section in Figure 13;

Figure 15 is a sectional view taken on the line 15—15 of Figure 3;

Figure 16 is a plan view of the lever for the float valve;

Figure 17 is a left side elevation of a modification;

Figure 18 is a top plan view of the same;

Figure 19 is a vertical cross sectional view;

Figure 20 is a fragmentary elevation of the adjusting means for the idling jet;

Figure 21 is a vertical sectional view on the line 21—21 of Figure 18;

Figure 22 is a fragmentary sectional view taken on the line 22—22 of Figure 21;

Figure 25 is a diagram indicating in connection with the diagram of Figure 26 the increased controlling effect which is obtained by an air bled jet in connection with the operator's control valve; and Figure 27 illustrates in section automatic means for controlling the pressure governing valve.

Figure 1:
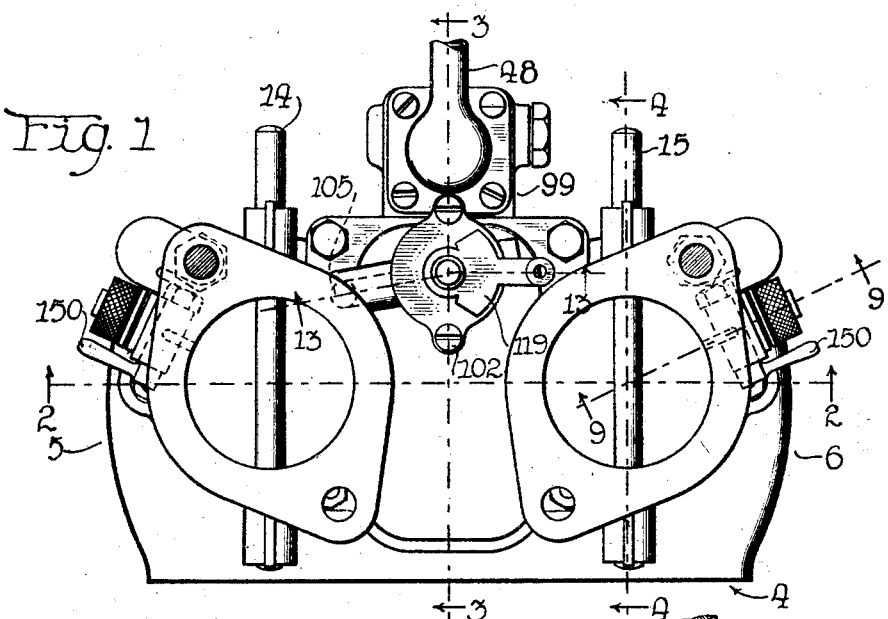
Figure 1 is a top-plan view of a device embodying our invention.

The particular embodiments illustrated are adapted to be employed with the usual V-shaped aeroplane engine, having twin sets of cylinders with the carburetor disposed within the V. We do not, however, intend to limit the invention to such use.

The body of the carburetor, shown in the drawings, is divided into two main sections, namely, the lower or air intake section 1, and the upper or throttle housing section 2, both of these sections having a portion of the float chamber 3 disposed therein. The lower section 1 has an enlarged mouth or air opening 4, facing forward. The inlet 4 is entirely open to the atmosphere and is of a size suitable to take in air for both units 5 and 6, without choking or interference.

The intake 4 may be connected to a suitable hot air connection, provision being made for this at the screw sockets 7 and 8, shown in Figure 4.

The throttle housing section 2 provides the outlets 10 and 12 which are governed by suitable throttle valves 11 and 13 of the usual or any preferred construction. These throttle valves are in practice connected together so that they may be operated simultaneously.

The body of the carburetor, comprising both sections 1 and 2, is preferably made of aluminum. The shafts 14 and 15 of the throttle valves 11 and 13 are mounted in brass or bronze bushings 16 to reduce wear.

Figure 2:
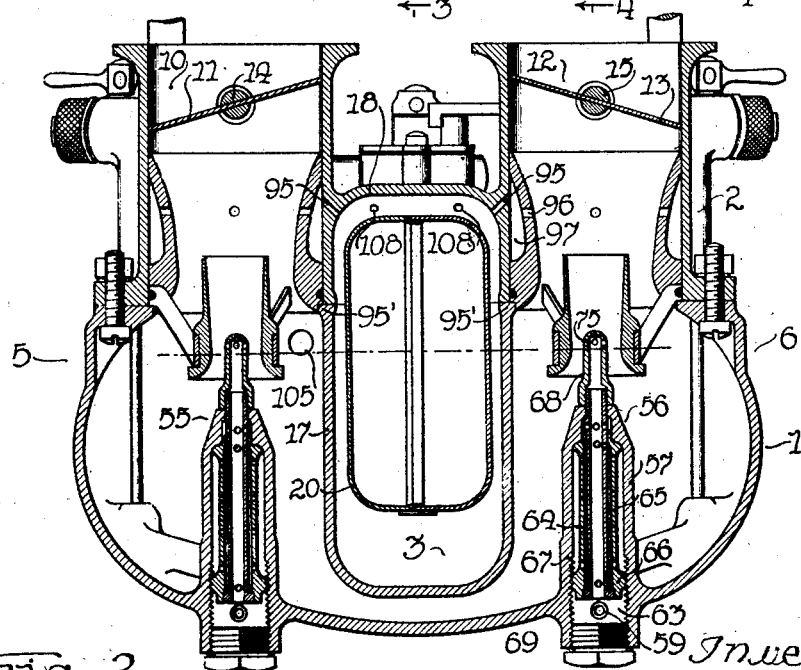
Figure 2 is a longitudinal vertical section of the same taken on the line 2—2 of Figure 1.

The float chamber 3 is formed of a lower section 17 integral with the lower casing section 1; and an upper portion 18 integral with the upper section 2. The float chamber itself is formed in the shape of a short drum or cylinder with the corners rounded, lying on its side. The float 20 is of a similar shape, though smaller in size so as to have room for play within the float chamber. The float is shown in Fig. 3 in the position which it occupies when the valve controlled thereby is closed. During operation of the engine fuel is used quite rapidly and the float drops down a slight distance sufficient to permit the requisite flow of liquid fuel to pass the valve 29. When in such lower position i. e. when the engine is in operation and drawing fuel, the part of the float chamber in which the liquid level will stand for the various operating positions of the plane, is substantially symmetrical about the float. The float 20 is made up of two sheet metal sections 21 and 22, joined by a tapered overlapping joint as shown in Figure 2. The portion 22 has a beveled edge and the portion 21 has a tapered shoulder which engages the beveled edge and a cylindrical part fitting within the open edge of the section 22. This joint is brazed to secure a tight union.

The float 20 is joined to a float lever or fork 24 by means of a foot or plate 25 which is formed integral with the lever 24. The lever 24, as shown in Figure 16, is stamped out of sheet metal having the foot or plate 25 and the two arms 26 which are connected together by the shouldered rivet 28 which forms the connection with the needle valve 29. The outer ends of the arm 26 are mounted upon a shouldered bearing sleeve or bushing 30, the ends of which fit snugly between the boss 31 formed on one side and the removable plug 32 on the other side. A pin or shaft 33 forms the fulcrum for the lever 24,—this pin or shaft being preferably secured to the removable plug 32 and having its inner end seating in a recess in the side walls.

The needle valve 29 comprises a stem 35 having a slot 36 in the lower end thereof. The spring plunger 37, slidable in the bore of the body 35, is adapted to be pressed against the pin 28 to hold the stem of the needle valve in pivotal connection with the lever 24. The portion 17 of the float chamber communicates with the compartment 42, which is formed in the lower part of an extension or casing 40, formed on the lower body portion 1. A gasoline receiving chamber 41 is formed in the upper part of the casing 40,—the chambers 41 and 42 being separated by the wall 43. A valve seat member 44 in the shape of a plug and having a valve port 45 provides communication between the receiving chamber 41 and the float chamber proper.

The upper end of the valve stem 35 bears a hard metal tip 46 which co-operates with the valve seat 44. The top of the receiving chamber 41 is closed by cover member 47, having a suitable connecting nipple 48 which is connected to the gasoline pipe leading from the main tank.

The construction of the float and float valve is novel and is designed to secure freedom from difficulties heretofore encountered in carburetors for aeroplane engines and the like. It will be noted that the valve 35 is placed as near the float 20 as is feasible. The spring connection between the movable valve plug and the float is such that the valve will not chatter and pound the valve seat and wear the same out, due to vibrations of the device, as has heretofore been experienced. Movement of the valve with the float in a downward direction is secured by a positive connection, as this motion does not, in any way, affect the valve or seat.

Access to the float valve is provided by the removable plug 50 in the bottom of the chamber 42, directly below the valve so that by dropping the float 20 to its lowermost position and moving the valve 35 sidewise from the pin 28, the valve may be removed.

The float chamber and float are of such construction and proportions as to operate under a great variation in position such as will be met in aeroplane work. As the float is cylindrical and as the valve is placed very close to the float itself, inclination of the carburetor in a fore and aft manner does not interfere with the operation of the device, except in the extreme positions. The float 20 is of relatively large size so that even in the extreme position the necessary force to operate the valve is secured by the buoyancy of the float. The float 20 lies above the lever 24 so that even if the aeroplane should dive vertically, the float would have an effective lever arm with respect to the pivot 28 and would govern the flow of gasoline thru the valve.

There is a unique coordination in the relation of the means for maintaining the fuel level and the nozzles 55—56. The float 20 is shown as drum-shaped. Being drum shaped, it is symmetrical about its longitudinal axis, and that axis is normally horizontal. The float is made of such width, diameter and weight that the plane of flotation i. e., the plane of the surface of the liquid fuel in which it floats, passes substantially through the longitudinal axis of the float when the carburetor is in normal upright position. Then in order to keep said plane of flotation and said float axis substantially in coincidence when the plane in which the carburetor is carried, noses either up or down i. e., is tilted fore and aft, the fuel level must swing about a horizontal axis which is substantially coincident with the line between the outlets of the two nozzles and which is also substantially coincident with the horizontal axis of the float in normal position. This is accomplished by making that part of the chamber which during normal operation contains the liquid fuel level substantially symmetrical about the same axis as that about which the float is symmetrical. Since the float is drum-shaped the part of the float chamber in which the liquid level lies for the various operating positions of the carburetor, is likewise substantially drum-shaped. Thus the desired result of having the liquid level stand substantially on the horizontal line joining the nozzle openings is accomplished for normal operation of the carburetor whether the plane is level or nosed up or nosed down.

The main nozzle units 55 and 56 are mounted in the lower part of the carburetor axially in line with the outlets 10 and 12.

We shall describe the structure of the unit 56 only, as these units are similar in construction. The nozzle unit 56 is provided with a well casing 57 formed integral with the body section 1. This well casing extends down below the bottom of the body 1, being closed by a plug 58. An inclined passageway 59 (see Figure 4) having a metering restriction 60, communicates with a horizontal passageway 61, which leads into the bottom of the float chamber (see Figures 3 and 4). The diagonal passageway 59, between the bottom of the well casing and the horizontal passageway 61, is threaded internally and is arranged to receive a screw-plug 60, which has an orifice therethrough for limiting the discharge of fuel from the nozzle unit. This restriction is better from a mechanical standpoint than an adjustable valve, because it is very difficult to adjust a plurality of valves to the same discharge. The plug 60 may be removed and another substituted, for changing the capacity of the orifice. The upper end of the diagonal passageway is closed by a removable plug 62.

The interior of the well casing 57 is divided into two compartments, namely, the normal well 63 and the accelerating well 64. These compartments are separated by a sleeve member 65, which has a threaded head member 66 screwing into the interior of the well casing. The main nozzle 67 extends upward through the sleeve and through the top of the well casing, having a separable tip 68 secured upon its upper end by screw threads.

The nozzle 67 comprises a tube or sleeve having a shoulder 69 at its lower end, adapted to engage in a recess in the head 66 for holding the walls of the nozzle 67 away from the walls of the sleeve 65. Near its upper end the nozzle 67 is provided with a slightly enlarged portion 70, which fits closely within the top of the sleeve 65 so as to hold the sleeve 65 and the nozzle 67 concentric with each other but with a small annular space between them to permit air to move from the accelerating well into said space and through a series of small orifices 71 which are formed in the side walls of the nozzle 67 just below the enlargement 70.

The sleeve 65, which defines the accelerating well 64, is pierced by a number of holes 72 through the side walls, these holes preferably being arranged in vertical rows. A series of small openings 73 are formed through the side walls of the nozzle 67 near its lower end, so that communication is afforded between the normal well 63 and the accelerating well 64. The tip 68 is provided with a series of holes 75 in the side walls immediately adjacent to the top of the tip.

A small bleeding chamber 76 is formed about the upper end of the sleeve, this bleeding chamber communicating with the interior of the nozzle 67 by means of the bleeding openings 77 which are of small size and which are arranged around the sides of the nozzle within the bleeding chamber. The bleeding chamber 76 communicates with a horizontal passageway 78 which in turn communicates with the atmosphere through a vertical passageway 79 in the air inlet plug 80. It will be seen that air is admissible to the nozzle 67 by way of the bleeding openings 77, passageway 78, and vertical passageway 79; a nozzle of this nature, wherein air is admitted to it, is known as an "air-bled" nozzle.

The air inlet tube 80 is threaded into an opening in the body of the carburetor. The lower end of the plug is adapted to seat at 81 in the metal of the body and this lower end has a calibrated orifice 82 which communicates with a horizontal bleeding passageway 83 for bleeding the accelerating well. The intermediate portion of the plug 80 is reduced as shown in Figure 4, to provide an annular space between the side walls of the hole in which the plug is secured and the sides of the plug. This annular space communicates at its lower end with the horizontal passageway 78 and communicates with the bore 79 of the plug by way of a calibrated orifice 84.

The bore 79 communicates with the interior of the intake 4 by way of passage 92 and this partakes of the same pressure conditions that prevail about the main air intake. The plug 80' closes off the hole in which the inlet tube 80 is seated.

Air entering by way of the bore 79 of the plug 80 is free to enter the accelerating well for bleeding the same or to be drawn into the bleeding chamber 76 for breaking up the stream of fuel through the nozzle 67 and for compensating the mixture.

The nozzle unit 56 is provided with a main venturi 85 which fits tight within the side walls of the cylindrical barrel portion 86. A second Venturi member 87, of smaller diameter, has its upper end projecting slightly beyond the most restricted portion of the main venturi 85 and the tip 68 of the nozzle unit projects into the secondary or smaller venturi so that the openings 75 in the top of the tip are placed slightly beyond the most restricted portion of the secondary venturi 87. In the design of any carburetor there are two essential requirements, which to a certain extent oppose one another;— to deliver a maximum charge of air to the engine, and to exert the maximum atomizing effect upon the fuel, which maximum atomizing effect is more or less a function of the suction or force by which the fuel is drawn from the nozzle. A strong suction on the nozzle usually involves a high velocity past it, and to obtain a higher velocity in an ordinary single Venturi carburetor generally involves a considerable vacuum or depression in the intake manifold of the engine. This means that the air charge delivered to the engine is rarefied and of less density than would be the case if the air velocity were less, thus preventing maximum air charge if the suction on the nozzle is to be sufficient, while if the single venturi is made of such size as to operate properly at low air velocities it will not be adequate for the demand at high air velocity. By applicants' arrangement only a small part of the air taken in by the motor is raised to high velocity, and the maximum charge of air is most efficiently secured on both low and high suctions simultaneously with a maximum suction upon the nozzle. This result is secured basically by the use of two Venturi tubes, with the secondary Venturi outlet disposed at the point of greatest depression in the large venturi, a most important point since improper relation of the tubes makes the desired action impossible; then improved by the "air bleeding" of the nozzle. This last-named point is important for this reason: it is an accepted fact that in an ordinary uncompensated carburetor the mixture tends to grow richer as the suction increases. The double venturi partly counteracts this tendency by reason of the passage of air only between the two venturis and the bleeding of air into the jet also partly counteracts this tendency, together counteracting it entirely or practically so. If either of these devices were designed to do all the compensating their purposes would be defeated. If the bleed were made large enough to do so the liquid fuel would go out in slugs, and if the outer venturi were made too large it would not produce the desired effect upon the inner one. Thus, these two devices, by working together and in harmony, have been found to produce the desired result. The secondary venturi is supported on the main venturi by means of a ring 88, having a series of spider arms 89, notched at their upper end to receive a retaining ring 90 (see Figures 4, 5, and 6) which retaining ring is preferably made of spring wire. The retaining ring 90 lies in a groove 91, formed in the outer surface of the main venturi 85, the spider arms 89 being set into slots cut into the bottom of the venturi so that the notched ends of the spider arms 89 lie within the groove 91, so that the spring retaining ring 90 securely holds the spider arms in position. It will be noted that the spring retaining ring is provided with an inwardly extending portion 93, which is set into a hole in the main venturi. This prevents any tendency for the ring to slip around so that the opening might come in register with one of the spider arms. The spring retaining ring is further provided with offset spring portions 94, which are adapted to cause the ring to fill the groove 91 laterally and hold the spider arms yieldingly in place to prevent vibration or rattling. The spring retaining ring is thus held not only against circumferential displacement, that is by rotation in the groove 91, but also against lateral displacement in the groove 91, so that the spider arm is held against any possibility of dislocation or disconnection.

The lower end of the main venturi 85 rests upon the shoulder or ledge 95, where the body member 2 joins the body member 1 so that there is no opportunity for the main venturi or the secondary venturi to drop down. The spring retaining ring 90 is held in the groove by the side walls 86 of the body member within which the venturi is fitted.

The venturi is formed with a groove on its outer surface forming a chamber 97 when the venturi is in place within the bore of the tubular throttle housing 86, this annular space being in communication with the interior of the venturi through a series of openings 96, which connection subjects the annular chamber 97 to a predetermined suction existing at the points of the openings 96. This annular chamber 97 communicates with the top of the float chamber 3 by way of a passage 95 so that a predetermined suction or sub-atmospheric pressure may be maintained within the float chamber, as will be described later.

In a double unit of this character it is desirable to secure, as near as possible, an absolutely equal discharge of fuel from each of the jets or nozzle members 55—56. This is secured primarily by means of calibrated orifices in the calibrated plugs 60, shown in Figure 4. In order to secure a different rate of fuel feeding for adjusting the total quantity of fuel discharge by both nozzle units, we have provided a novel form of control of the gasoline discharge by controlling the sub-atmospheric pressure within the float chamber 3. The calibrated orifices 60 divide the work equally between the nozzle units at all times and the sub-atmospheric control of the float chamber controls the quantity of flow to both of the nozzle units. To secure this control of the sub-atmospheric pressure we provide a controlling valve generally designated by the reference 99. This control valve comprises a valve housing 100 formed integral with the upper body member 2 and placed substantially between the throttle housings 86.

The valve housing 100 has a cover 101 adapted to be clamped on the top of the housing by means of the machine screws 102. The interior of the valve housing provides a chamber 103 which communicates with the atmosphere through the passageway 104. The passageway communicates with the atmosphere through a port 105 opening into the air intake as is shown in Figure 2. The passageway 104 and port 105 are made of ample size to permit a free passage of air to the valve chamber 103. The valve casing provides a flat valve seat at the bottom, adapted to co-operate with a rotary valve member 107 for controlling the ports 108 which open into the float chamber 3.

The valve member 107 has a boss 109 extending down into a pocket in the valve seat 106 for centering the valve member. A circular boss or stem 110 is connected by a transverse slot 111 and a tenon 112 to a short operating shaft 113 which projects through a bearing 115 in the valve cover 101.

The operating shaft 113 is provided with a flange 116 adapted to bear on the under side of the valve cover 101 and this flange is pressed against the same by means of a coil spring 117, which keeps the valve member 107 upon its seat and holds the flange 116 against the bottom of the cover 101 to prevent leakage of air past either of these members. The tenon 112 is formed integral with the operating shaft 113, so that turning of the shaft operates the valve head 107. The shaft 113 is pinned to an operating arm 118, which operating arm is under the control of the driver. The operating arm 118 is provided with a sector portion 119 (see Figure 1) in the lower face of which sector portion are provided a number of sockets 120, adapted to be engaged by the rounded nose of the spring plunger 121. The spring plunger 121 is guided in a suitable bore in the hub 122 of the cover plate 121, the spring 123 pressing the top of the plunger 121 against the bottom of the sector and tending to hold the arm 118 yieldably in place.

The valve disc 107 is provided with two sets of openings, 124 and 125 respectively, these openings being of different sizes to restrict more or less the passage of air through them. As the suction exerted on the openings 96 in the main venturis draws air from the mouth of the float chamber by way of the passages 95, causing a sub-atmospheric condition therein, there is less tendency for the fuel to be drawn out of the nozzles and thus a difference in the effective level in the float chamber is secured.

This sub-atmospheric condition is controlled by the extent to which air is admitted to relieve the same. When the valve disc 107 is moved so that the passages 108 are completely closed, the full sub-atmospheric effect will be exerted in the float chamber. Upon moving the valve disc to the position where the openings 124 register with the ports 108, the sub-atmospheric condition within the float chamber will be relieved to a greater or less extent, changing the effective level in the float chamber accordingly. When the openings 125 are brought in register with the ports 108, the sub-atmospheric effect in the float chamber is substantially eliminated.

The pilot control valve 99 is useful in any type of carburetor and with any type of gasoline nozzle but we find that there is a peculiar co-operation between the pilot control valve and the air bled jet which we employ because of the greater controlling effect which it is possible to exercise over the rate of flow of the fuel.

The diagram of Figure 26 illustrates the action involved. This diagram shows the gasoline nozzle 56 having the air bled port 77. The diagram of Figure 25 shows the nozzle 56 without the air bled jet.

Assuming that in the smaller or secondary venturi 87 a suction of one pound existed and that the suction in the outer venturi at the port 96 is .40 lbs., then the suction within the float chamber 3 may be varied between .40 lbs. and 0 lbs. suction by adjustment of the valve 99.

Now, assuming the same conditions to obtain in Figure 26, but that due to the air bleeding at the port 77 the suction exerted upon the gasoline in the tube which supplies the nozzle 56 is .70 lbs., it will be seen at once that the maximum suction of .40 lbs. in the float chamber 3 will have a greater effect upon the flow of gasoline subject only to .70 lbs. as indicated in Figure 26 than upon the construction wherein the suction is 1 lb., tending to create a flow of the gasoline. The law governing the rate of flow due to pressure or to a static head is well known as $V^2 = 2gh$.

In other words, the rate of flow of gasoline to the nozzle 56 depends upon the square root of the pressure tending to produce said flow. In the air bled construction of our invention we find that the air bleeding does have a double function, first of breaking up the gasoline and permitting it to flow more freely and second to secure a greater percentage of regulation or a greater range of variation of flow producible by the operator's control valve 99.

The idling jet designated as a whole by the reference character 126, has an opening under the lip of the throttle valve 13 as shown in Figure 9, for supplying mixture to the engine when the engine is idling. A relatively large hole is cut through the side wall of the throttle housing under the lip of the throttle valve 13 and a bushing 127, which forms an internal valve seat, is pressed into this hole. The cylindrical portion 128 which is pressed into the opening is milled so that when the plug is forced into the hole the milled surface will grip the bore of the hole and resist turning or loosening. The plug 127 is provided with a small axial bore 128' which forms the fuel discharge nozzle for the idling jet, this opening 128' being controlled by a tapered needle valve 129. A plug 130 is threaded into the outer end of the hole in the wall of the throttle housing to close the same, the lower end of this plug having a rim resting against the bushing 127 and securely holding the same in place. The needle valve 129 has a threaded stem 131 threaded in the outer end of the plug 130 and this stem is secured at its outer end to a hollow valve operating button or handle 132 by which the needle valve 129 is adjusted. The valve handle 132 is in the form of a hollow cup fitting over the outer end of the plug 130 and being adapted to engage a spring plunger 133 seated in the side of the plug. The circular flange 134 of the plug 130, which flange engages the outside of the bushing 127, is perforated with a number of holes to permit the fuel which enters by way of the vertical passage 135 to enter the interior of the plug and pass out at the valve port 128. A small packing nut 136 is threaded into the open end of the plug 130 and holds a suitable packing 137 about the stem of the needle valve 128.

The valve bushing 127 has a vertical bore 139 such as would be formed by drilling transversely through the milled portion of the bushing. A vertical slot 140 communicates with the bore 139, the bore and the slot thus communicating with the valve port 128' to permit gasoline to flow from the valve to the interior of the barrel. As the throttle valve 13 normally lies about midway across the slot 140, air will be free to enter below the valve, pass through the slot and the bore and out of the slot and bore above the valve. Difficulty has heretofore been experienced where the idling jet has consisted merely of a small circular opening, in that a slight movement of the throttle valve towards the open position has obstructed the idling jet or removed the current of air from it to such an extent that insufficient mixture or an improper mixture was formed. In the present case a movement of the throttle 13 away from the closed position has no such disturbing effect as the opening is in the form of a vertical slot.

The variations in port area of the idling jet should follow substantially a straight line law for the small angles of change of the throttle valve which effect the idling jet. The slot does this effectively and a circular hole will not do so. For small changes of the throttle valve from closed toward open position, the conditions of suction above and of atmospheric pressure below the throttle do not materially change. As the throttle moves from the closed position the part of the slot exposed to suction increases and the part exposed to air or that which bleeds the suction decreases, thus a greater effective feeding of gasoline is secured.

The vertical gasoline passageway 135 is connected by means of a vertical supply tube 141 and a transverse passageway 142, with the interior of the accelerating well 64.

We have provided a novel priming jet for starting the engine as shown in detail in Figures 9 and 10. A small valve body 145 is formed integral with the side walls of the barrel member. A valve plug 146 is adapted to rotate in the cylindrical bore of the valve body, this plug having a passageway 147 therethrough adapted to communicate when the valve is in the open position with a passage 148 registering with the vertical bore 139 in the valve bushing 127. At its upper end the valve passage 147 is adapted to register with the priming nozzle or passage 149. The valve plug 146 is preferably formed with a slight taper in order to insure tightness of the same. A small valve operating handle 150 is connected to the plug and extends outward in suitable position to be readily accessible for starting the engine.

A holding spring 151, fastened in any suitable manner to the barrel member, engages a cam 152 on the opposite end of the valve plug 146 and holds this plug in any position in which it is moved.

For starting the engine, assuming that the float chamber is properly supplied with liquid fuel, the throttle valve is closed and the priming valves 146 are opened as shown in Figures 9 and 10. The engine is then turned over. Fuel is drawn from the float chamber by way of the accelerating well 64 through passages 142, 141 and 135, through the idling valve nozzle 128 and out by way of the priming nozzle 149. When the engine starts under its own power the priming valves 146 may be moved to closed position, the engine then depending upon the idling nozzle to supply the necessary mixture for turning the engine over.

Air enters the open slot 140 beneath the lip of the throttle and passes up past the idling nozzle opening 128 and out by way of the slot above the lip of the throttle. As the throttle valve is closed the suction exerted upon the idling nozzle is relatively high and causes a suitable flow of fuel at that point.

When the throttle is moved from the closed position a slight distance, the main nozzles will begin to function, fuel being drawn through the main nozzle 67 and out at the tip 68. The suction upon the main nozzles is increased by the multiplying effect of the double Venturi arrangement.

The normal fuel level maintained by the float and valve is slightly below the level of the outlet of the main nozzles.

The bleeding passages for the bleeding chamber and for the accelerating well are filled with liquid fuel when the device is at rest. As soon as suction is exerted upon the main nozzles the fuel in these bleeding passages will be discharged through the main nozzle particularly upon starting and for accelerating of the engine.

As soon as the bleeding openings 77 in the bleeding chamber 76 are uncovered, air enters in radial jets, tending to break up the stream of fuel in the main nozzle 67. Thus an air emulsion is secured which atomizes and vaporizes more easily. At the same time the desirable characteristics of an air bled jet are secured.

The air which enters the top of the accelerating well is partially drawn off through the radial openings 71 in the side walls of the main nozzle 67. These openings further help to bleed the main fuel jet and tend to maintain a condition of sub-atmospheric pressure in the top of the accelerating well.

Upon further opening of the throttle to accelerate the engine, the increase in suction exerted upon the main nozzle 67 draws some of the fuel out of the accelerating well by way of the opening 73 at the lower end of the main nozzle 67, uncovering the upper ones of the openings 72 in the side walls of the accelerating well casing. Thus a further reserve in the accelerating well is maintained for acceleration at higher speed.

The metering orifice in the plug 60 controls the rate of flow from the float chamber to the main nozzle. Each nozzle is thus provided with a metering orifice to secure equal division of flow between the main nozzles. To reduce the effective flow through these orifices, the controlling valve 99 may be operated to close off the atmospheric passageways 105—104 so that the suction exerted at the openings 96 in the venturis operates upon the top of the float chamber. If greater effective flow is to be secured the valve is moved so that this sub-atmospheric condition in the float chamber is relieved to the extent desired.

The openings 96 in the side walls of the venturi may be employed to control the degree of suction exerted upon the top of the float chamber. Thus by varying the position, in the venturi, of these openings to draw the desired degree of suction from the venturi, the sub-atmospheric condition in the top of the float chamber may be correspondingly varied.

The nozzle construction of our invention is designed to secure bleeding of the main jet without producing any irregularities of flow such as are occasioned by certain prior constructions. The air which enters the main nozzle by way of the fine openings 77 in the bleeding chamber 76, tend to form a fairly homogeneous mixture or emulsion. The particular fault of prior nozzle constructions is that the air entering the tube or nozzle tends to form bubbles which fill the bore of the tube so that alternate slugs of fuel and bubbles of air are projected out of the nozzle. This tends to give an irregular erratic action which is undesirable. The air which enters the nozzle by way of the bleeding opening 71 in the top of the accelerating well has a similar effect, due to the fineness of the openings and the fact that the air enters these openings in such a way as to be diffused by the action of the radial jets.

In Figure 7 we have shown a modified form of main nozzle structure. In this structure the sleeve 65′ serves both as the inner wall of the accelerating well and as the main nozzle. This sleeve is provided with a series of openings 72 along the sides, the upper openings 71′ corresponding to the openings 71 in the form shown in Figures 1 to 6, as they permit the air from the bleeding passageway 83 to pass into the column of liquid issuing from the main jet or nozzle. The radial openings 77 which open into the bleeding chamber 76 correspond to the opening 77 shown in Figures 1 to 6.

A round rod 155 secured at its lower end to the screw plug 58, projects up through the bore of the main nozzle, being provided at its upper end with a head which is cut away at portions of its periphery to permit passage of the fuel. It is well known that the bubbles of air in the liquid fuel tend to assume a spherical form and when these bubbles become sufficiently large they tend to fill the bore of the tube 65′ forming the main nozzle, thus causing erratic feeding of the fuel. This appears to be due to the surface tension of the liquid. We have taken advantage of the surface tension in preventing the formation of bubbles sufficiently large to fill the bore of the tube by inserting the rod 155. As the bubbles tend to retain a substantially spherical contour the rod 155 tends to hinder the formation of any bubbles which would fill the annular space between the tube 65′ and the rod 155.

In Figure 8 we have shown a modified form of main nozzle structure in which the sleeve 65' is similar in construction to that shown in Figure 7. However, instead of employing the rod 155 for breaking up the bubbles of air which enter the column of fuel, we provide a restricted orifice 156 for increasing the velocity of flow of the liquid as it enters the bore of the sleeve 65'. The purpose of this restriction 156 is essentially to increase the speed of flow and not to serve necessarily as a metering orifice, although this restriction may be employed as a metering orifice.

By increasing the speed of flow at this point the tendency will be for a stream of liquid to be projected into the bore of the sleeve 65' without filling this sleeve completely, so that the bubbles of air which enter by way of the bleeding openings 72 will not have an opportunity for filling the bore of said sleeve. This action is particularly noticeable when the fuel has been drawn out of the accelerating well so that an annular body of air surrounds the jet and prevents it from completely filling the bore of the tube.

We wish to call particular attention to the position of the main nozzles with relation to the float chamber. The air entrance to the carburetor is faced toward the front of the airplane. Within the angles of approximately 40° climb or 80° dive, the float level will be regulated within the float chamber and will be in normal relation to the main nozzles. On side slips or side dives a very large angle of inclination will be permissible before the discharge hole on the float chamber to the uppermost jet is exposed to air, which stops the discharge of gasoline from that jet. We have found that the ordinary type of float mechanism ceases to operate at angles of more than 30° from the vertical. When the float chamber is offset from the jet and the machine dives with closed throttle, the gasoline floods the entire motor. The float needle valve of our invention takes up vibration through the spring connection and keeps the needle point and needle seat from wearing out.

The accelerating well and main nozzle structure is adapted to secure a free bleeding action without the objectionable irregularity in fuel feed.

The idling jet we have found to be a decided improvement over present construction. We find that the high suction on the idling jet extends to a much greater throttle opening than in any other construction with which we are familiar. This permits us to use a very large Venturi tube, which is highly desirable, and at the same time we are able to get an intermediate range by the use of the throttle on the idling jet.

Figure 23:
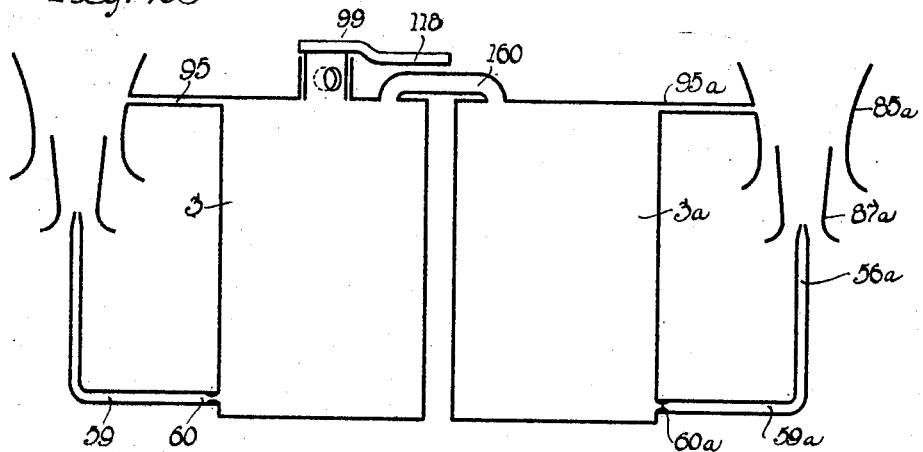
Figure 23 is a diagram illustrating the application of the operator's control valve to the float chamber of two carburetors operating in unison.

The operator's control of the mixture is obtained by subjecting the float chamber to varying degrees of suction, taken from the main venturi. In a 12-cylinder motor carrying a four carburetor unit (2 twins), it is practically impossible to adjust the four carburetor units to the same discharge. We therefore employ fixed jets. It is necessary, however, to have a control of the adjustment and the means we employ, having fixed size metering orifices, allows of making the action equal on all four units. We can also use the controlling device shown on one carburetor float chamber and seal the other carburetor float chamber from atmosphere and determine the pressure in it above the gasoline by an equalizing connection from the first mentioned float chamber, as shown in Figure 23. In other words, the second float chamber is made a continuation of the first and therefore subject to the same sub-atmospheric conditions.

In Figure 23 we have shown the single control valve 99 as operating to control the pressure prevailing in the float chambers 3 and 3ª of the two carburetor units which supply mixture to the same engine. The float chamber 3ª is sealed up and communicates with the float chamber 3 by means of the equalizing tube 160.

The connection 95ª of Figure 23 may be closed or may be left open. All that is essential is that the connecting tube 160 be large enough to equalize pressures.

Figure 24:
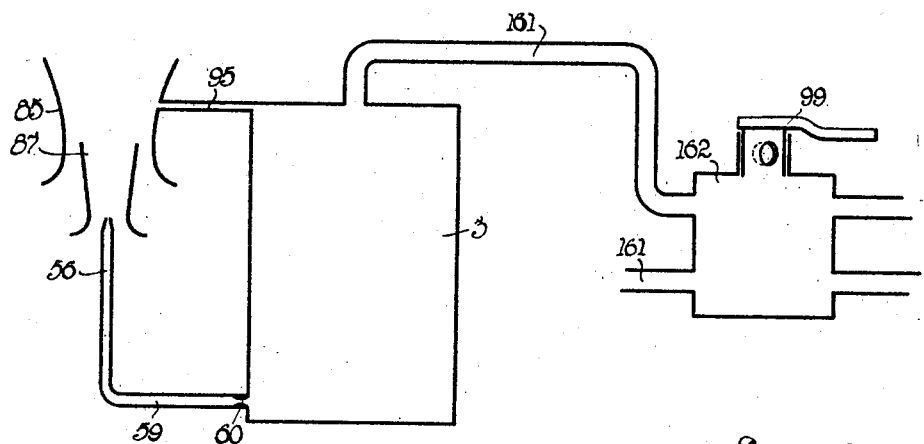
Figure 24 is a diagram illustrating the application of the operator's control valve, and a central control chamber, to a number of carburetors operating in unison.

The operator's control valve 99 may be located at any convenient point as shown in Figure 24 with connecting tubes 161 leading to the various float chambers of the different carburetor units. In this case a small central chamber 162 is provided. From this central chamber upon which the valve 99 is mounted, the various pipes 161 lead to the float chambers of the different carburetors to maintain the degree of pressure on top of the liquid fuel in each float chamber at the same value to secure equal flow, which flow may be controlled in accordance with the wishes of the operator.

The priming device of our invention is highly advantageous and forms, in connection with the idling jet suction, a very simple and effective device.

We have provided an overflow connection 157 which is tapped into a small draining well 158 in the bottom of the carburetor intake. This overflow connection is led outside of the fuselage to discharge overboard any fuel which may be spilled.

In Figures 17 to 22 inclusive we have illustrated a modified form of carburetor embodying certain of the features of our invention. In this construction the float chamber 3 has not been placed directly between the nozzles 55 and 56 but immediately behind and between said nozzles. This construction is employed in order to bring the outlets 10 and 12 as close together as possible. The throttle valves 11 and 13 are mounted upon a common shaft 14' which is adapted to be operated by the controlling lever 163. A pair of stop bracket arms 164 containing suitable set screws 165 for adjusting the limits of motion of the throttle valves 11 and 13 are fastened to a common hub, which in turn is attached to the throttle shaft 14'. At the opposite end of the shaft 14 a throttle stem spring 166 shown in dotted lines in Figure 18 is mounted within the throttle stem cap 167, which in turn is pinned to the throttle stem or shaft 14'. This spring bears against the interior of the throttle stem cap and at the side bears against the throttle stem bushing 168 which, like the bushings 16 described in the previous embodiment, are preferably made of brass or bronze. A washer 169 is interposed between the spring and the bushing 168. This arrangement of the spring on the throttle stem tends to hold the throttle in any given position and also tends to hold the parts tight so that they will not vibrate or rattle.

As shown in Figure 20 we have provided a removable gasoline strainer 170 within the chamber 41 on the tank side of the float needle valve 46. This strainer is formed in the shape of a frusto-conical wire screen, the larger open end of which rests upon a cap member 171, which cap member has an opening fitting over the end of the valve seat member 44. At its upper end the strainer 170 has a washer 172 between which and the top of the hollow cap 173 there is placed the compression spring 174. This spring holds the strainer in place in such a manner as to prevent movement or to prevent vibration and rattling.

In this modification the size of the passageways between the float chamber 3 and the nozzle units 55 and 56 is controlled by plugs 60 having calibrated orifices.

The type of accelerating well and nozzle is substantially the same as that shown in Figure 8.

Instead of drilling the bleeder passageway 78 from the rear in this modification we drill the same from the front and close the open end by means of the air bleeder channel plug 176. This plug consists of a machine screw. A locking clip 177 is held between two gaskets under the head of the plug 176 and this locking clip has a forked end like a wrench which engages the base of the tip 67 to prevent the same from unscrewing from the nozzle and well member 65.

The accelerating well and the nozzle member 65 is provided with an enlarged head which closes off the bottom of the accelerating well 64, this well communicating with the float chamber 3 only through the restriction in the plug 156' through the channel 59 and the calibrated orifice in the plug 60.

The idling well and nozzle structure herein differs from the prior embodiment. A tube 141 of relatively small bore which has its lower end secured in the plug 179 which plug forms the idle tube holder, extends through the body of the throttle housing to the idling nozzle 126. The idling tube 141 passes through the air passageway 79' which air passageway communicates with the air in the air horn 4 by way of the port 180. The idling tube 141 communicates through apertures 181 in the holder 179 and the channel 142' with the accelerating well 64. It will be noted that there is a passageway 178 along the side of the accelerating well and nozzle member 65 which forms a communication between the bleeding passageway 78 and the top of the accelerating well 64.

The idling tube 141 bears at its upper end a nozzle having a reduced bore controlling the flow of liquid fuel from the float chamber during idling. The plug member 127' has a vertical hole 139 which communicates by way of the vertical slot 140 with the interior of the throttle housing 12, this slot 140 lying immediately under the lip of the throttle valve 13 when the same is in closed position. The plug 127' has a bore 128' through which the fuel mixture for idling passes on its way into the engine manifold.

The plug 127' has a lateral recess 183 lying immediately above the idling nozzle 182 and communicating with the bore 128'. A channel or annular space 184 is formed about the inner end of the plug 127', this channel or annular space forming an air space for air which is admitted by way of the port 185, valve port 186 and radial port 187 in the idle adjusting plug 130'. The idle adjusting plug is threaded into the opening in which the nozzle member 127 is seated, this plug being screwed against the rear end of said plug 127', to hold the same firmly in position.

A needle valve 129' is threaded into the hub or extension 188 of the adjusting plug 130' for controlling the amount of air which enters by way of the ports 185 to form in connection with the liquid fuel entering from the idling nozzle 182, a mixture for supplying the engine during idling.

The construction of the idling needle valve is novel and forms an important improvement in this particular part of the apparatus.

The needle valve 129' comprises a suitable cylindrical stem which is threaded to fit within the boss or extension 188 and has a slot or other suitable means for applying an adjusting tool such as the screw driver. This valve member has a diametrical hole near the outer end of the same, a spring and a pair of spherical rollers lying in said bore as is shown in Figures 19 and 20. The interior of the hub or extension 188 is provided with a series of longitudinal grooves into which the rollers 190 tend to seat under the influence of the spring 191. This construction is formed by first drilling a series of holes—for instance, six in number—with centers lying on a circle which is substantially equal to the diameter of the valve. A large hole is then drilled with its bore substantially equal to the diameter of the valve, said hole cutting across the series of smaller holes and thereby forming a plurality of longitudinal seats or grooves which are adapted to hold the rollers 190 and thus the valve 129' against movement.

The operation of the idling jet herein shown is apparent and obvious from the description of the jet described in connection with the prior embodiment.

The pilot valve herein shown is structurally different from the one shown in the prior embodiment.

The pilot control valve 99' is mounted upon the top of the float chamber 3 and comprises a movable lever 118 connected to the hollow rotatable valve sleeve 193, which is mounted in the valve bushing 194. The lower end of the valve bushing 194 is held in place by the threaded ring 195 which seats against a suitable shoulder in the metal of the top of the float valve housing 3. The valve bushing 194 is provided with a peripheral groove or channel 196 which communicates by way of the channel 95' with a chamber 197 formed in the metal between the throttle housings of the two outlets 10 and 12. This chamber 197 communicates with the annular space or channel 97 formed in the body of the main venturi 85. Thus the chamber 197 is subjected to the suction prevailing at the openings 96 in the venturi 85.

The valve sleeve 193 is provided with a pair of valve openings 198 and 199, the valve bushing 194 is provided with a pair of diametrical holes 200, of substantially the same size as the larger hole or port 198 in the valve sleeve 193. It will be noted that the ports 198 and 199 are not arranged diametrically in the valve sleeve 193, but are so arranged that upon turning the valve 193, the port 199 which is smaller, will first be opened gradually until the same is wide open and thereafter the larger port 198 starts to open and the smaller port 199 closes. Thus a gradual increase in valve port area is secured.

The float chamber 3 communicates through a restricted orifice 201 and through the passageway 202 with the atmosphere in the air horn 4. The passageway 202 communicates through a strainer or screen 204 with a transverse channel 203. The pilot valve handle 118 has a hub 205 forming a housing for a compression spring 206 for retaining the valve sleeve 193 with its rim 207 firmly in the groove formed by the junction of the bushing 194 and the ring 195. The hub or housing 205 is suitably pinned to the valve stem 208.

We have found that due to the vibration it is advisable to lock all parts in place. We have therefore threaded small wires through the various plugs and the like to prevent the same from turning on the screw threads.

The operation of this embodiment of the invention will be apparent from the previously described operation.

In Figure 27 we have shown an automatic control for the pilot valve. Thus, instead of employing the manually operated valve as shown in Figures 21 and 22 we provide a valve which is operated automatically by a pressure and temperature controlled element, the setting of which may be manually controlled by the pilot. For this purpose we provide a housing 210 which is supported on the legs 211, these legs being in turn secured on top of the main body section 1, above the float chamber 3. The housing or casing 210 provides a chamber 213 for the pressure and temperature controlled element 214. The pressure and temperature controlled element 214 is locked on the cap 215 by means of a hollow nut 216. The casing 210 is also formed with a lateral housing 217 for the valve 218 and the spring barrel 219. The valve 218 controls a port 220 formed in the seat member 221 which seat member is in the form of a plug threaded into the lower part of the casing 210. The side walls of the seat member 221 are provided with openings 223 which openings form a communication between the interior of the seat member and the suction passageway 95'. The valve 218 is provided with a stem 224 which stem is adjustably mounted in the guiding sleeve 225. The upper end of the stem 224 is provided with a slot for adjustment as by means of a screw driver and is provided with spring retaining means such as has been previously shown and described in connection with the idling valve shown in Figures 19 and 20. The guiding sleeve 225 has a head which rests against a flange 226 formed on the lower end of the spring barrel 219. The upper end of the spring barrel 219 is closed by a head member 227 to which is attached the controlling handle or lever 228. A suitable compression spring 229 is held within the barrel 219 between the head of the valve guiding sleeve 225 and the head of the barrel 219.

We have provided a spiral slot 230 in the side walls of the spring barrel 219 and a stationary pin 231 in the adjacent part of the casing 210, so that rotative motion of the lever 228 will tend to increase or decrease the tension of the spring 229. A coarse screw thread might be employed in place of the pin and slot.

The temperature and pressure controlled element 214 has a stem 232 at its lower end which plays in a suitable guide 233 in the lower part of the casing 210. A connecting lever 234 pivoted at 235 in the casing 210 connects the stem of the valve 218 with the stem of the pressure and temperature sensitive element 214.

We find that as the carburetor rises in altitude it is necessary to make a correction in the mixture to give less gasoline. To this end the multiple diaphragm element 214 is filled with air at ordinary sea level atmospheric pressure with a small quantity of vapor of a volatile liquid. The spring 229 and the multiple diaphragm element 214 oppose each other. In this condition the needle may be either seated tightly or adjusted partly open. As the aeroplane carrying this carburetor rises in altitude the air on the outside of the multiple diaphragm loses its pressure with the result that the air inside expands, raises the needle and admits suction or increases the admission of suction into the float chamber space 3, thereby making the mixture leaner. The volatile liquid which is sealed within the multiple diaphragm element 214 will provide an action of limited force which will add to the force tending to raise the needle at high temperature and abstract from it at low temperatures, which action is also advisable. The needle valve 218 may be adjusted through the opening 236 in the head of the spring casing 219.

The vapor of the volatile liquid may be omitted as the air acts in a certain degree in response to temperature.

We do not intend to limit our invention to specific use in aeroplane service, as the invention is obviously adapted to any other use found desirable.

We claim:

In a carburetor, the combination of a casing forming a pair of carbureting passages, a fuel nozzle in each of said passages adapted for simultaneous operation throughout the working range, a float chamber of relatively small transverse dimension located between said carbureting passages, a cylindrical float having its axis horizontal and having a pivotal support, the pivotal axis of which support is parallel with the float axis, the axis of said float lying substantially in a line connecting the discharge openings of said nozzles, the plane of flotation of said float in said float chamber normally passing substantially through the said axis of the float, and the portion of the chamber within which the various positions of the liquid fuel level lies, being substantially symmetrical about said axis, so that tilting of the carburetor produces a minimum variation of the fuel level of said nozzles.

In witness whereof, we hereunto subscribe our names this 5th day of July, A. D. 1918.

FRANK C. MOCK.
CHARLES J. GUSTAFSON.
MILTON E. CHANDLER.